Patented July 11, 1944

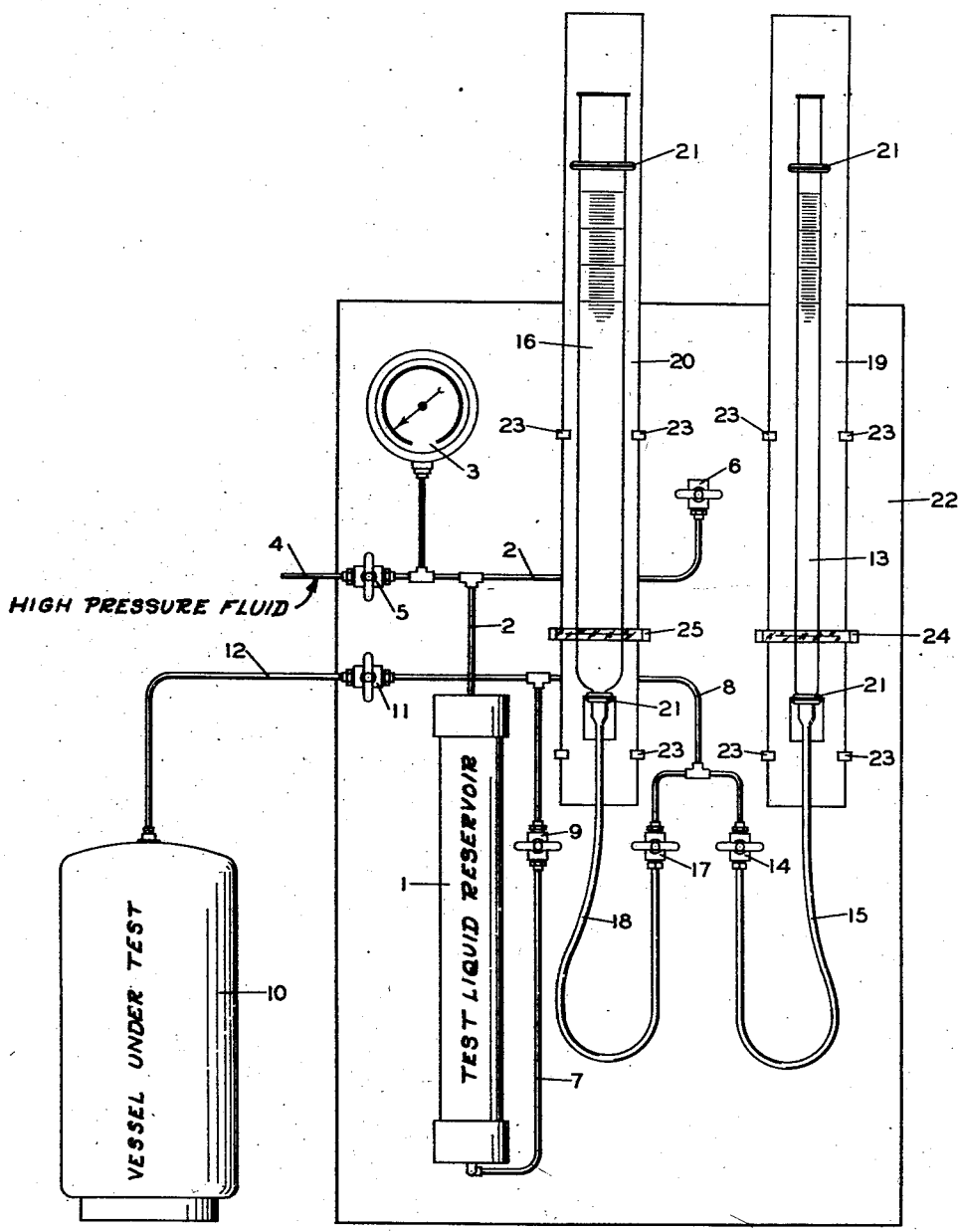

2,353,275

UNITED STATES PATENT OFFICE 2,353,275

CONTAINER PRESSURE WITHSTANDING TESTING DEVICE

Theodore A. St. Clair, Pontiac, Mich., assignor to Phillips Petroleum Company, a corporation of Delaware Application August 28, 1941, Serial No. 408,670

11 Claims. (Cl. 73—51)

This invention relates to a method of and apparatus for testing pressure vessels.

Portable pressure vessels, particularly those used for storage and transportation of liquefied gases, must be examined periodically to determine their fitness for service. Statutory regulations in many instances require testing of pressure vessels under specified pressure conditions dependent upon the original specifications. The present invention is particularly concerned with the testing of relatively small liquefied petroleum gas containers in accordance with regulations imposed by law when such containers are used in interstate commerce. It will be readily apparent, however, that the method and apparatus may be used for other vessels.

Steel, when subjected to a stress below its elastic limit, may be temporarily deformed. When the stress is relieved, the steel returns to its original shape. When a steel pressure vessel is subjected to pressure, the stress in the steel results in a slight expansion of the vessel. When the pressure is released such a vessel normally returns to its original size and shape. During a period of use, however, the pressure vessel may become dented, or weakened by corrosion, or otherwise changed from its original condition to such an extent that it becomes unfit for service. When a container in weakened condition is subjected to a high pressure, the expansion in volume which it undergoes is greater than normal and the container does not return to its original volume when the pressure is released. The amount of permanent expansion offers a basis for testing the vessels or containers to determine their fitness for service. Under the present standard test conditions, the vessel to be tested is subjected to twice the working pressure for which it was originally designed and the total volume expansion measured. Then the pressure is released and the permanent expansion determined. A permanent expansion greater than 10% of the total expansion is taken as an indication that the pressure vessel is not in condition for active service.

At present there are two methods of testing in general use. The hydrostatic or water jacket method of testing is the more widely used of the two. This method consists in placing the container in a testing chamber containing water, applying pressure internally to the container, and measuring the water displacement from the testing chamber. When the pressure is applied to the container, the total expansion is determined by measuring the water displacement from the chamber into a measuring device. When the pressure is released, the quantity of water which fails to return to the chamber from the measuring device, represents the permanent expansion of the container. The testing chamber must be sealed during the test for accuracy of measurements and the chamber completely filled with water. It is evident that this method of testing, while accurate, is time consuming and not readily adaptable to testing of a number of containers varying greatly in size. A further disadvantage of the water jacket method arises from the difficulty experienced in handling the larger of the portable containers.

The direct displacement method of testing consists in filling the container with fluid, applying the test pressure, and measuring the permanent and total expansion directly from the fluid volumes. While the direct displacement method is much simpler than the water displacement method, difficulty has been experienced in accurately measuring the testing fluid under pressure.

The present invention is an improvement on the direct displacement method of testing and provides apparatus by which the testing fluid may be accurately measured at low pressure.

An object of this invention is to provide an improved method of testing pressure vessels.

A further object of this invention is to provide apparatus adaptable to testing pressure vessels of various sizes.

A further object of this invention is to provide apparatus for accurate displacement testing of pressure vessels in which displacement volumes are measured at atmospheric pressure.

The drawing is an elevation of the apparatus of this invention.

With reference to the drawing, the numeral 1 designates a fluid volume chamber designed to contain the test liquid and to withstand the test pressure. From the top of chamber 1 a pressure line 2 communicates with a pressure gage 3. High pressure fluid from any suitable source may be admitted to the pressure line 2 through the pipe 4 and the valve 5. The fluid may be released from the pressure line 2, if desired, through the valve 6. The pipe 7 is connected to the bottom of the chamber 1 and to a manifold pipe 8. The valve 9 is interposed in the pipe 7 between the chamber and the manifold. From the manifold 8, liquid for testing may be admitted to the container 10 to be tested through the valve 11 and conduit 12. Liquid from the manifold 8 may be admitted to the burette 13 through the valve 14 and the flexible conduit 15 or to the burette 16 through the valve 17 and flexible conduit 18. The burettes are mounted on the boards 19 and 20 by the holders 21. The boards 19 and 20 are slidably mounted on the instrument panel 22, being held in position thereon by the guides 23. To aid in making accurate volume readings on the burettes, a reference line relative to the instrument panel is established by suitable markings on the transparent level indicators 24 and 25 attached to the instrument panel.

In operation the container 10 is filled with liquid prior to beginning of the testing operation. For the testing of liquefied petroleum gas containers, kerosene has been found to be a suitable liquid for use in the test because it is readily available, relatively inexpensive, has a low vapor pressure, and the small amount remaining in the container after the test has no harmful effect when the container is placed in service. With the container 10 entirely filled with the liquid so that no air or gas bubbles are present therein, the pipe 12 is connected to the container as indicated in the drawing. With the valves 6, 11, 14, 17 and 9 open, the liquid volume chamber 1, the burettes 13 and 16, and the associated piping are filled with the test liquid to the reference line indicated on the transparent level indicators 24 and 25. The boards 19 and 20 on which the burettes are mounted may be moved vertically relative to the instrument panel 22 until the liquid level in the burettes corresponds to the reference line. The volume of liquid in the burette used in the test is determined by reading of the graduations at the liquid level. The graduations on the burettes 13 and 16 represent respectively their volumes between said graduations. The valves 6, 14 and 17 are then closed. Fluid under pressure from the source associated with pipe 4 is admitted to the volume chamber 1 through the valve 5 and pressure line 2 until the required test pressure, as indicated by the pressure gage 3, is reached. Nitrogen gas, which is readily obtainable in cylinders under high pressures, has been found to be especially suitable as the source of fluid under pressure for testing liquefied petroleum gas containers. The gas admitted through the valve 5 displaces the test liquid from the volume chamber 1 through the pipes 7 and 12 to the container 10 being tested. When the pressure gage 3 indicates that the required test pressure has been reached, the valve 9 is closed. The test liquid under pressure in the container 10 is then admitted to one or both of the burettes, as required, through the corresponding valves 14 and 17. The liquid displaced into the container 10 during the application of test pressure expands the container. Release of the pressure by opening of valve 14 or 17 allows the container to contract displacing liquid to the corresponding burette. The amount of liquid displaced from the container to the burette is measured by reading of the calibrations on the burette, preferably by moving the burette downward until the liquid level therein corresponds to the reference line on the level indicators. The amount of liquid so determined represents the temporary expansion of the container during the test plus the compressibility of the volume of liquid used for testing. By correcting for the compressibility of the liquid at the test pressure and temperature, the temporary expansion of the cylinder may be determined. The temperature of the test liquid may be taken immediately before, immediately after, or during the test.

The amount of liquid displaced from the container 10 resulting directly from the compressibility of the test liquid may be calculated from the volume, temperature and pressure, and the compressibility factor of the liquid. After determination of the quantity of liquid displaced from the container to the burette, the valve 6 is opened to allow the gas to escape and thereby release the pressure from the liquid volume chamber 1. The valve 9 is then opened allowing the test liquid to return to the liquid volume chamber from the burette. Since the container is to some extent permanently expanded, some additional liquid from the burette is required to fill the liquid volume chamber and to bring the liquid level back to the reference line. The permanent expansion of the container is determined by raising the burette until the liquid level corresponds to the reference line. The difference between the burette reading taken in this position and the original reading represents the permanent expansion of the container. The total expansion of the container is equivalent to the temporary expansion plus the permanent expansion. The test results are conveniently expressed as the ratio of the permanent expansion to the total expansion.

It will be apparent to those skilled in the art that the present invention provides an accurate method and apparatus for testing pressure vessels by direct displacement and by measurement of the testing liquid at low pressures. Flexibility of the apparatus of the present invention is much greater than with the previous testing devices. Containers of different size may be tested with the present apparatus merely by proper choice of, or combination of, measuring burettes. Since a minimum amount of liquid is required for testing with the present device, the effect of temperature change during the test is much less than with water displacement methods previously used. The measurement of the displaced testing liquid at low pressures by the present device eliminates the necessity for high pressure gage glasses heretofore required by direct displacement methods of testing.

Having described my invention, I claim:

1. The method of testing vessels for temporary expansion and permanent deformation under pressure which comprises filling the vessel to be tested with the testing liquid, supplying additional liquid under pressure from a test liquid reservoir to the vessel until the desired test pressure is reached, releasing the excess liquid from the vessel by releasing the pressure thereon, and determining the quantity of liquid expelled from the vessel when said pressure is released as a measure of the temporary expansion minus the permanent deformation of the vessel, returning said expelled liquid to the test liquid reservoir, and adding thereto a sufficient volume of test liquid to fill said test liquid reservoir to its original level, said volume of test liquid added being a measure of the permanent deformation of the vessel being tested.

2. The method of testing vessels for permanent deformation under pressure which comprises filling the vessel to be tested with the testing liquid, supplying additional liquid under pressure from a test liquid reservoir to the vessel until the desired test pressure is reached, releasing the excess liquid from the vessel by releasing the pressure thereon, and returning said expelled excess liquid to said test liquid reservoir, and adding thereto a sufficient volume of test liquid to fill the test liquid reservoir to its original volume, the volume of added test liquid being a measure of the permanent deformation of the vessel being tested.

3. The method of testing vessels for combined temporary and permanent deformation under pressure which comprises filling the vessel to be tested with the testing liquid, supplying additional liquid under pressure from a test liquid reservoir to the vessel until the desired test pressure is reached, releasing the excess liquid from the vessel by releasing the pressure thereon, and determining the quantity of liquid expelled from the vessel when said pressure is released, returning said expelled liquid to the test liquid reservoir, and adding thereto a sufficient volume of test liquid to fill said test liquid reservoir to its original volume, the combined quantity of expelled liquid and volume of test liquid required to fill said test liquid reservoir to its original volume being a measure of the total deformation of the vessel being tested.

4. Apparatus for hydrostatic testing of pressure vessels comprising; a test liquid reservoir, a conduit leading from the reservoir to a vessel to be tested; said reservoir, vessel and conduit adapted to be filled with testing liquid at substantially atmospheric pressure; means for pressuring the top of the test liquid in said reservoir, means for volumetrically measuring at said substantially atmospheric pressure the amount of testing liquid transferred from the reservoir to the vessel being tested as a result of pressuring the test liquid in said reservoir minus the amount of testing liquid, if any, that remains in said vessel due to permanent distortion of said vessel by said pressuring and means for returning the measured testing liquid to the reservoir together with a measured additional amount of testing liquid sufficient to restore said reservoir to its initial liquid level.

5. Apparatus for hydrostatic testing of pressure vessels comprising in combination a test liquid reservoir, means for applying gas under measured pressures to the top of any test liquid in the reservoir when desired, means for venting the top of the test reservoir to the atmosphere when desired, at least three conduits communicating with one another at a central point, the first of said conduits communicaing with the lower end of said reservoir, a valve in said first conduit, the second of said conduits communicating with the vessel being tested, a valve in said second conduit, the third of said conduits communicating with at least one flexible conduit of substantially constant internal volume, a valve in said third conduit, said flexible conduit communicating with the bottom of a graduated chamber, the top of said graduated chamber being open to the atmosphere, said graduated chamber being mounted to slide vertically relative to said reservoir, and datum point means adjacent said graduated chamber mounted to slide vertically relative to said reservoir independently of said chamber, whereby measurements of temporary and permanent increase in volume of said vessel under pressure may be made without subjecting said graduated chamber to any substantial pressure differential from the atmosphere.

6. Apparatus for hydrostatic testing of pressure vessels comprising in combination a test liquid reservoir, means for applying measured pressures to the top of any test liquid in the reservoir when desired, means for venting the top of the test reservoir to the atmosphere when desired, three conduits communicating with one another at a central point, the first of said conduits communicating with the lower end of said reservoir, a valve in said first conduit, the second of said conduits communicating with the vessel being tested, a valve in said second conduit, the third of said conduits communicating with a flexible conduit of substantially constant internal volume, a valve in said third conduit, said flexible conduit communicating with the bottom of a graduated chamber, the top of said graduated chamber being open to the atmosphere, said graduated chamber being mounted to slide vertically relative to said reservoir, and datum point means adjacent said graduated chamber mounted to slide vertically relative to said reservoir independently of said chamber, whereby measurements of temporary and permanent increase in volume of said vessel under pressure may be made without subjecting said graduated chamber to any substantial pressure differential from the atmosphere.

7. Apparatus for hydrostatic testing of pressure vessels comprising in combination a test liquid reservoir, means for applying gas under measured pressures to the top of any test liquid in the reservoir when desired, at least three conduits communicating with one another at a central point, the first of said conduits communicating with the lower end of said reservoir, a valve in said first conduit, the second of said conduits communicating with the vessel being tested, the third of said conduits communicating with at least one flexible conduit of substantially constant internal volume, a valve in said third conduit, said flexible conduit communicating with the bottom of a graduated chamber, the top of said graduated chamber being open to the atmosphere, said graduated chamber being mounted to slide vertically relative to said reservoir, and datum point means adjacent said graduated chamber, whereby measurements of temporary and permanent increase in volume of said vessel under pressure may be made without subjecting said graduated chamber to any substantial pressure differential from the atmosphere.

8. Apparatus for hydrostatic testing of pressure vessels comprising in combination a test liquid reservoir, means for applying measured pressures to the top of any test liquid in the reservoir when desired, means for venting the top of the test reservoir to the atmosphere when desired, three conduits communicating with one another at a central point, the first of said conduit communicating with the lower end of said reservoir, a valve in said first conduit, the second of said conduits communicating with the vessel being tested, the third of said conduits communicating with a flexible conduit of substantially constant internal volume, a valve in said third conduit, said flexible conduit communicating with the bottom of a graduated chamber, the top of said graduated chamber being open to the atmosphere, said graduated chamber being mounted to slide vertically relative to said reservoir, and datum point means adjacent said graduated chamber mounted to slide vertically relative to said reservoir independently of said chamber, whereby measurements of temporary and permanent increase in volume of said vessel under pressure may be made without subjecting said graduated chamber to any substantial pressure differential from the atmosphere.

9. Apparatus for hydrostatic testing of pressure vessels comprising in combination a test liquid reservoir, means for applying measured pressures to the top of any test liquid in the reservoir when desired, three conduits communicating with one another at a central point, the first of said conduits communicating with the lower end of said reservoir, a valve in said first conduit, the second of said conduits communicating with the vessel being tested, the third of said conduits communicating with a flexible conduit of substantially constant internal volume, a valve in said third conduit, said flexible conduit communicating with the bottom of a graduated chamber, the top of said graduated chamber being open to the atmosphere, said graduated chamber being mounted to slide vertically relative to said reservoir, and datum point means adjacent said graduated chamber, whereby measurements of temporary and permanent increase in volume of said vessel under pressure may be made without subjecting said graduated chamber to any substantial pressure differential from the atmosphere.

10. Apparatus for hydrostatic testing of pressure vessels comprising in combination a test liquid reservoir, means for applying measured pressures including atmospheric pressure to the top of any test liquid in the reservoir when desired, three conduits communicating with each other at a central point, the first of said conduits communicating with the lower end of said reservoir, a valve in said first conduit, the second of said conduits communicating with the vessel being tested, the third of said conduits communicating with the bottom of a graduated chamber, and a valve in said third conduit, the top of said graduated chamber being open to the atmosphere, whereby measurements of temporary and permanent increase in volume of said vessel under pressure may be made without subjecting said graduated chamber to any substantial pressure differential from the atmosphere.

11. The method of testing vessels for temporary and permanent deformation under pressure which comprises attaching a reservoir to the vessel and filling the vessel and partly filling the reservoir with the testing liquid, measuring the level in the reservoir, supplying additional liquid under pressure from the reservoir to the vessel until the desired test pressure is reached, releasing the excess liquid from the vessel by releasing the pressure thereon and detrmining the quantity of liquid expelled from the vessel when said pressure is released as a measure of the temporary deformation minus the permanent deformation of the vessel, returning such of said expelled liquid to the reservoir as will return by gravity and remeasuring the level in the reservoir in comparison to the original level as a measure of the permanent deformation of the vessel being tested.

THEODORE A. ST. CLAIR.